United States Patent
Cvijanovic

(10) Patent No.: US 11,683,378 B2
(45) Date of Patent: Jun. 20, 2023

(54) RGB NETWORK AND DEVICES

(71) Applicant: Pfetch, Inc., Miami, FL (US)

(72) Inventor: Christi L. Cvijanovic, Miami Beach, FL (US)

(73) Assignee: Pfetch, Inc., Miami, FL (US)

( * ) Notice: Subject to any disclaimer, the term of this patent is extended or adjusted under 35 U.S.C. 154(b) by 0 days.

(21) Appl. No.: 17/763,944

(22) PCT Filed: Sep. 25, 2020

(86) PCT No.: PCT/US2020/052945
§ 371 (c)(1),
(2) Date: Mar. 25, 2022

(87) PCT Pub. No.: WO2021/067143
PCT Pub. Date: Apr. 8, 2021

(65) Prior Publication Data
US 2022/0353334 A1    Nov. 3, 2022

Related U.S. Application Data

(60) Provisional application No. 63/101,218, filed on Oct. 3, 2019.

(51) Int. Cl.
*H04L 67/125* (2022.01)
*G09G 3/20* (2006.01)

(52) U.S. Cl.
CPC ......... *H04L 67/125* (2013.01); *G09G 3/2003* (2013.01)

(58) Field of Classification Search
CPC .............................. H04L 67/125; G09G 3/2003
USPC ....................................................... 709/203
See application file for complete search history.

(56) References Cited

U.S. PATENT DOCUMENTS

| | | | |
|---|---|---|---|
| 7,362,861 B2* | 4/2008 | Yacobi | H04N 21/43632 380/212 |
| 2010/0296745 A1* | 11/2010 | Strom | H04N 19/176 382/233 |
| 2015/0070544 A1* | 3/2015 | Smith | H04N 25/75 348/297 |

FOREIGN PATENT DOCUMENTS

| | | |
|---|---|---|
| WO | 2013138476 A1 | 9/2013 |
| WO | 2019028269 A2 | 2/2019 |
| WO | WO-2019028269 A2 * | 2/2019 ............... A01B 3/02 |

OTHER PUBLICATIONS

International Search Report and Written Opinion for PCT/US2020/052945, dated Mar. 25, 2021, pp. 1-11.

* cited by examiner

*Primary Examiner* — Frantz B Jean
(74) *Attorney, Agent, or Firm* — Mei & Mark LLP

(57) ABSTRACT

A network can comprise client devices, provider devices, and a database array. The network can be configured for RGB formatted data. A client device processes and converts client inputs into rows of client data columns in a synthesizing database stored in a memory device. The client data rows comprise transcoded RGB formatting of the client inputs. A provider device processes provider inputs. Either the database array or the provider device can process the provider inputs into rows of provider data columns of transcoded RGB formatting of the provider inputs. A collimation of the client and provider RGB formatted data can result in an indicia of complementary client and provider inputs.

19 Claims, 13 Drawing Sheets

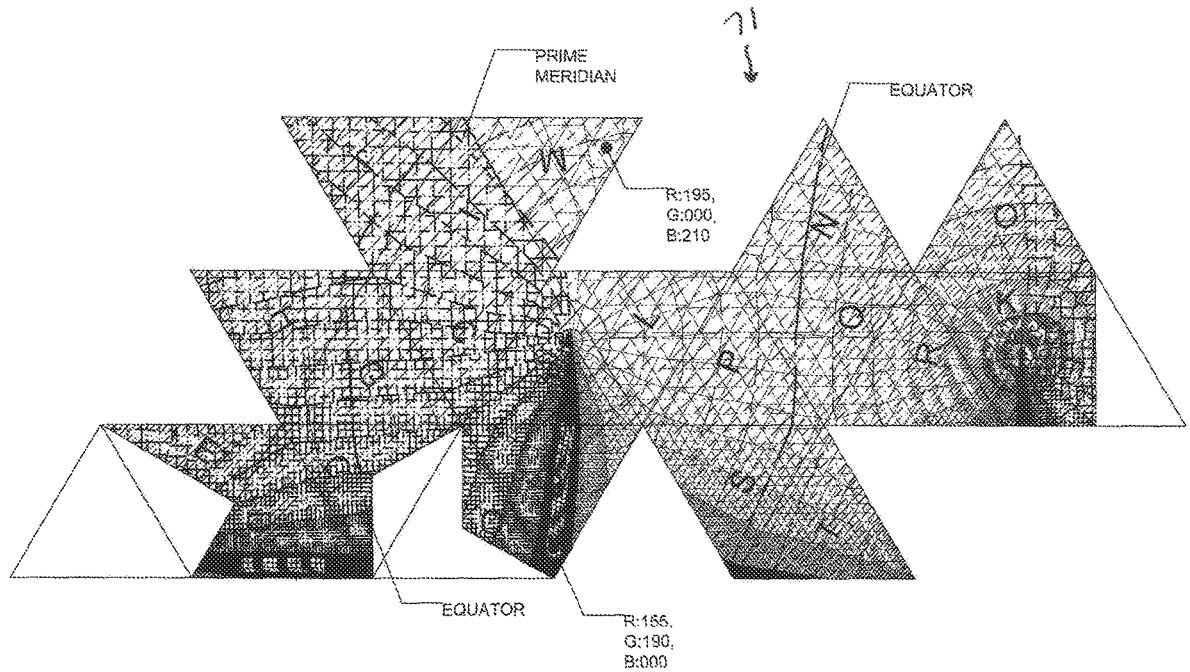
FIG. 7A
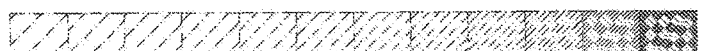
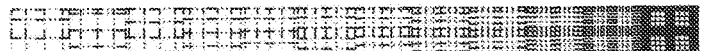
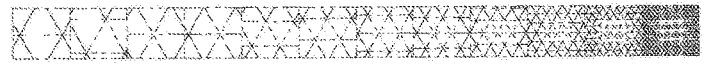

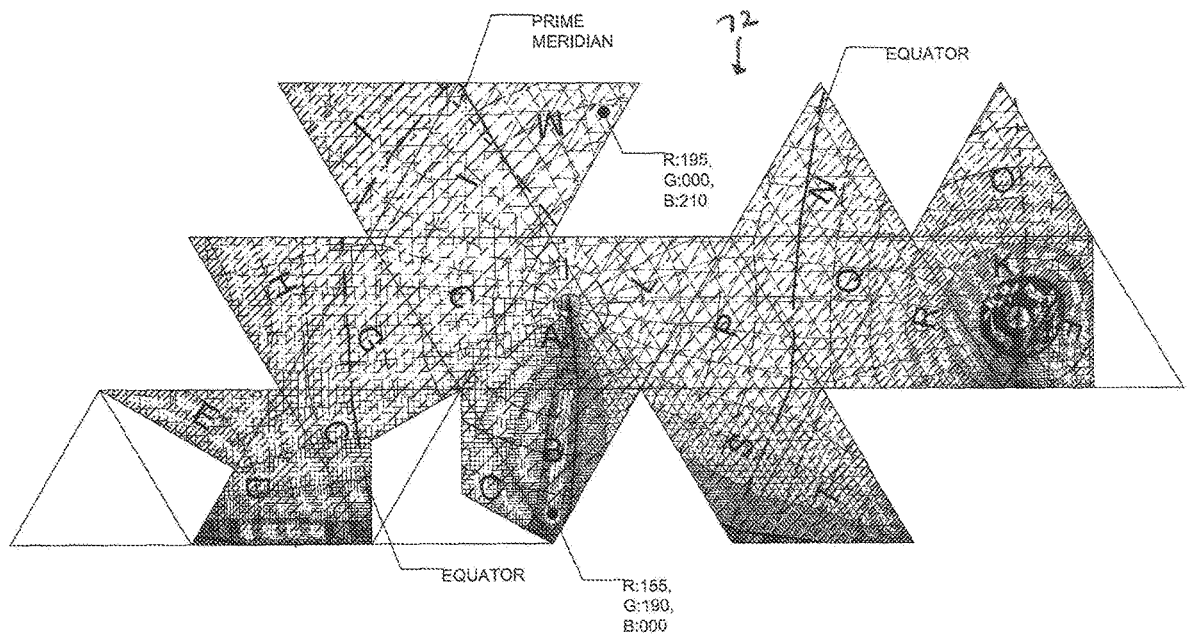
FIG. 7G
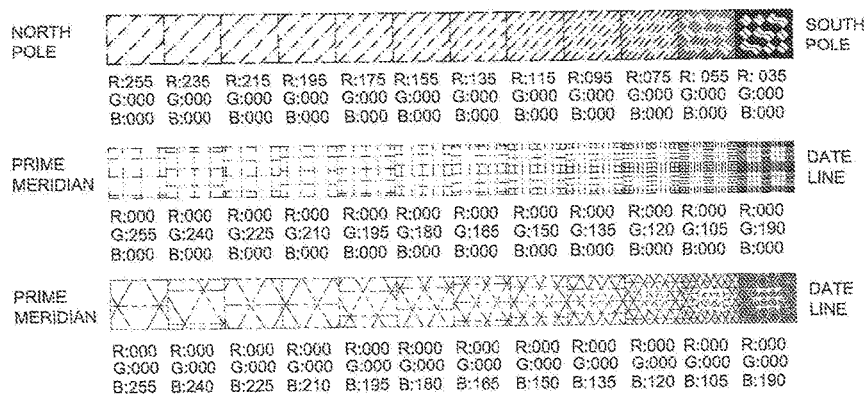

FIG. 8

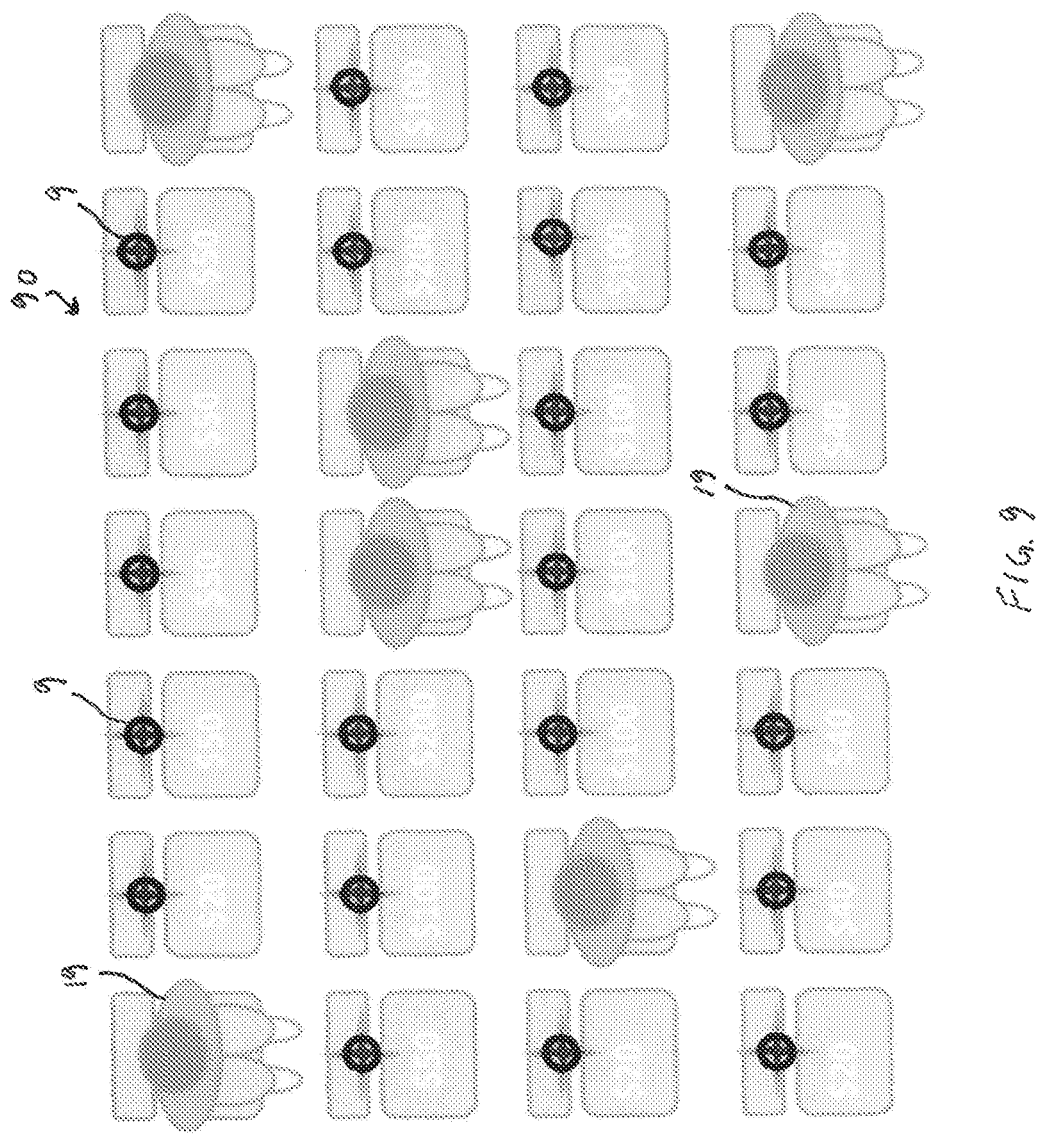

RGB NETWORK AND DEVICES

PRIORITY

This is a United States § 371 National Stage Application of PCT/US2020/052945 filed Sep. 25, 2020 and claims the benefit of U.S. provisional application 63/101,218 filed Oct. 3, 2019 all of which are incorporated herein by reference.

FIELD

This application provides a network and devices formatted for RGB data transmissions.

BACKGROUND

Network devices suffer from a lack of security. Many techniques such as encryption, hashing, among others have been developed to try to make it difficult for spyware or ransomware to obtain sensitive information. This makes network users hesitant to participate with networked providers. It is desired to increase security of user information in a network.

Further, it is desired to enhance ease of access to networked providers. Often, users avoid activities such as self-care or leisure appointments because of the difficulty in "shopping around." Concierge services can coordinate such bookings, but the use of the intermediary requires time and iteration.

SUMMARY

The network herein provides a new way to encode, store, exchange, transmit, decode, and receive data.

The network offers alternative solutions to the problem of unexpected limitations to individual and collective syntony. The first system in the network transforms existing technology to securely bring goods and services to individuals. In contrast, the second system transforms existing technology to virtually extend the individual to the goods or services. Lastly, the combination of the systems forms an intentional foundation for an optical wireless network. The optical wireless network can comprise photonic transcoding, micro led display, and data center devices.

A mobile application on a client device or provider device can feature the 3Ws (WHAT, WHERE, and WHEN) for search. Unique RGB color encoding and transmission matches physical work, virtual work, or things with relay of availability to clients and providers. Clients access a mobile app with improved data security, privacy, and efficiency. Clients input subject matter ["requests" or WHAT], location ["access" or WHERE], and time ["scheduling" or WHEN]. While a device such as a touchscreen, keyboard, or mouse can be used to input the client inputs, the client inputs can be processed in the client device digitally. However, an algorithm stored and processed on the client device can transform the digital data. The client inputs can be encoded as colors or frequencies. Then the client inputs resemble the formatting applied to pixels and can be said to be RGB formatted. The client inputs can be synchronized with a database array configured for the 3Ws. Now, multiple locations, languages, and time zones can be synchronized in the database array to provide discrete yet simultaneous outputs to the client device. Client 3Ws search and preferences can remain on the client device via an intelligent calendar. A synthesizer can operate on a synthesizing database to match geo-temporal RGB formatted data to seek complementary matches to the client inputs. Simultaneous search for providers complementary to client preferences can be made for all situations.

The network can connect to product information management ("PIM") data and onboarding surveys to keep the client's consumer data on the client device. This is a departure from other networks where client consumer data is shared, hacked, sold, mined and otherwise insecurely distributed in the network. Automatic synchronization between the 3Ws RGB database arrays and client devices generate client (buyer) and provider (seller) match notifications, including indicia on the client device. Matches can be made for what one needs or wants to accomplish during the window of time one has specified on the intelligent calendar as available to provide or receive services. As outlined herein, this alleviates a burden on the client to telephone around, search multiple databases, submit numerous inquiries or hire an intermediary concierge to do the same. In addition to automating such a cumbersome task, a security layer is applied that cannot be accomplished using traditional phone and search database methods. Instead of explaining parameters to a human concierge or subjecting clients to extensive cookies, privacy breaches, password and account collections to make a simple inquiry, the network herein can be configured so that the identity of the client does not leave the client device until a booking is made with a provider. Preferences, search history, and other intimate information can be obfuscated from the network to alleviate intrusion into a client's right to privacy. Now, the mental paralysis of procrastination can be lifted to enable users to engage in productive and non-intrusive commerce and leisure.

A network can comprise client devices, provider devices, and a database array. The network can be configured for RGB formatted data. A client device processes and converts client inputs into rows of client data columns in a synthesizing database stored in a memory device. The client data rows comprise transcoded RGB formatting of the client inputs. A provider device processes provider inputs. Either the database array or the provider device can process the provider inputs into rows of provider data columns of transcoded RGB formatting of the provider inputs. A collimation of the client and provider RGB formatted data can result in an indicia of complementary client and provider inputs.

A network comprises a client device configured to bidirectionally communicate with the network and to receive, store, and process client inputs in a client computing device comprising at least a client processor and a client memory device. The client inputs comprise at least client request data, client access data, and client scheduling data that are digitally processed within the client computing device. The client device processes the client inputs in the processor with a stored client algorithm from the stored memory device, the stored client algorithm configured to convert the client inputs into rows of client data columns in a synthesizing database stored in the memory device, the client data rows comprising transcoded RGB formatting of the client inputs.

The network can comprise a database array comprising at least a red database, a green database, and a blue database corresponding the RGB formatted data. A red data database can be configured for storing red RGB formatted client inputs and red RGB formatted provider inputs. A green data database can be configured for storing green RGB formatted client inputs and green RGB formatted provider inputs. A blue data database can be configured for storing blue RGB formatted client inputs and blue RGB formatted provider inputs.

The network can be configured so that the client device is further configured to receive, store & process network inputs in the computing device, the network inputs comprising at least provider request data, provider access data, and provider scheduling data. The client device can be configured to processes the network inputs in the client processor with the client algorithm configured to correlate the network inputs into rows of provider data columns in the synthesizing database, the rows of provider data columns comprising RGB formatting of the network inputs. The rows of client data columns can be synthesized with the rows of provider data columns. Synthesizing can comprise collimating the RGB formatted network inputs with the RGB formatted client inputs to result in a row of collimated pixel values. It is possible configure the network to discard the row of collimated pixel values when the row of collimated pixel values comprises one or more pixel value outside of a predetermined range of pixel values or when the row of collimated pixel values comprise non-white pixel values. Or, it is possible to configure the network so that when the row of collimated pixel values collimates within the predetermined range or when the row of collimated pixel values collimates to all white pixel values, the row of collimated pixel values is stored in one or more of the client device or database array and an indicia of a match is displayed on a client display device.

A network can comprise a provider device configured to bidirectionally communicate with the network and to digitally receive, store, and process provider inputs in a provider computing device comprising at least a provider processor and a provider memory device. The provider inputs can comprise at least provider request data, provider access data, and provider scheduling data. The provider device can be configured to process the provider inputs in the provider processor with a stored provider algorithm stored in the provider memory device. The provider algorithm can be configured to transcode the digital provider inputs into provider RGB formatted data. The provider request data can comprise a red provider request data pixel, a green provider request data pixel, and a blue provider request data pixel. The provider access data can comprise a red provider access data pixel, a green provider access data pixel, and a blue provider access data pixel. The provider scheduling data can comprise a red provider scheduling data pixel, a green provider scheduling data pixel, and a blue provider scheduling data pixel. The provider device can communicate the RGB formatted data to the database array. In an alternative, the provider device can forward the digital provider inputs to a server of the database array for RGB formatting.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIGS. 7A-7C are representations of access pixel spectrums.
FIGS. 8A-8C are representations of scheduling pixel spectrums.
FIG. 9 is an example of a remote access booking.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. Being a bidirectional system, several aspects will be described according to one pathway, and additional pathways can be understood and inferred by study of the Figures and examples. It is possible for a client described herein to be a provider, and so a client device can comprise additional aspects of a provider device. Likewise, a provider can be a client, and so a provider device can comprise additional aspects of a client device.

Users, including clients and providers, value their time. A provider can offer goods or services ("request" or WHAT) in select location(s) ("access" or WHERE) at select times ("scheduling or WHEN). For a client to be able to use or access those goods or services at the same time that they are available and according to the access parameters, the client needs transparency to the provider's WHAT, WHERE, & WHEN ("3Ws"). At the same time, the users need protection of their network presence.

Figure 1:
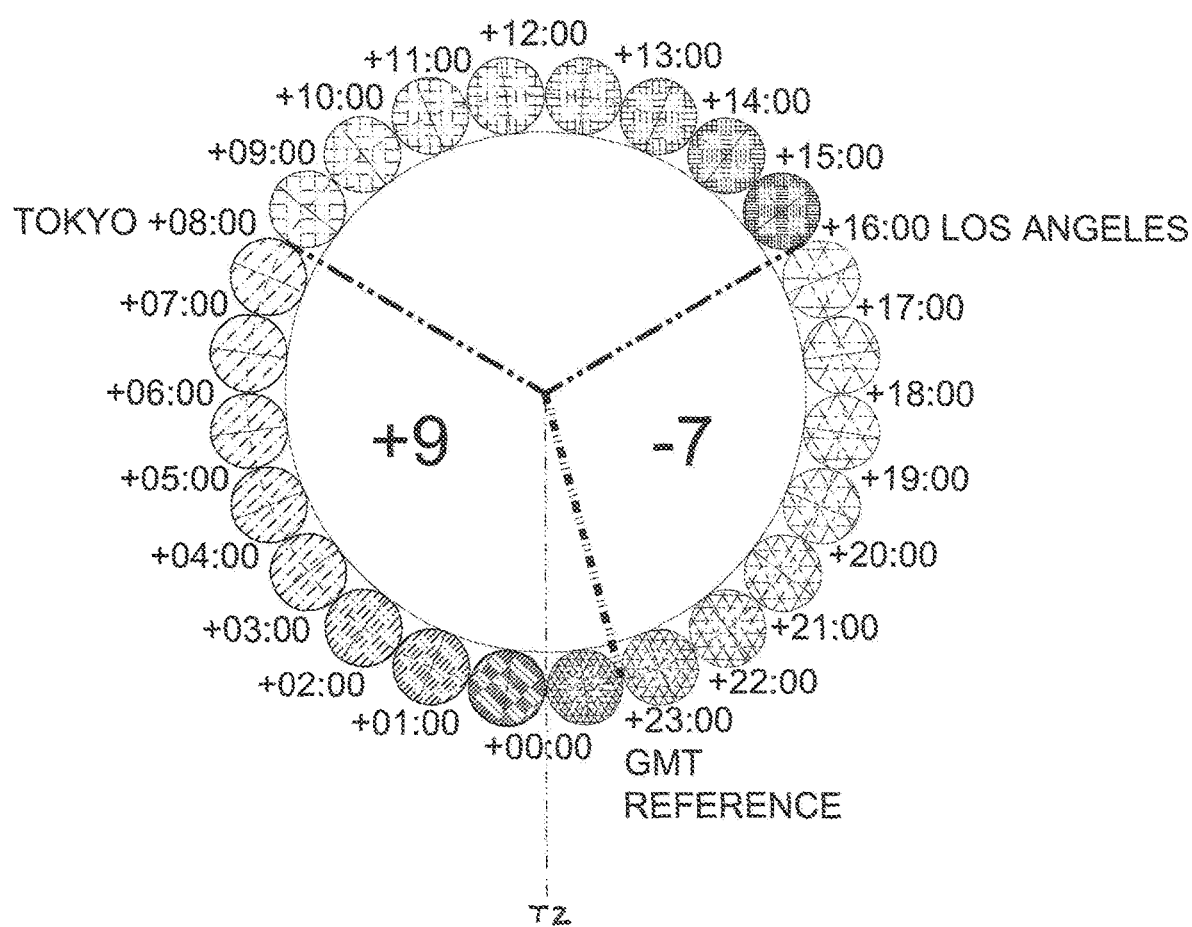
FIG. 1 is a view of global time zones.

It is possible to use time as an aspect of a search method. FIG. 1 facilitates an understanding of this aspect. It is possible to conceive of the time a seller or worker is available to offer goods or services as complementary to the time a buyer or employer has to receive goods or services. Complementary matching of time between two users is performed by assigning complementary colors between users available to give and users available to receive their time. FIG. 1 representatively shows a globe as the common circle. The time zones are distributed around the globe. The cross-catching of the smaller circles represents the time zones and the RGB formatted scheduling data associated with the time zones. At the base of the globe, at time zero axis TZ, a baseline zero time is given. As the globe is traversed, the time changes in one hour increments. Other increments of time can be selected, such as minutes, quarter hours, among others. The increments can be as varied as the pixel values in a pixel spectrum available to represent the time. Using Red Green Blue ("RGB") formatting, there are 16 million pixel values available to demarcate global time.

A user can designate time available to give goods or services and its complementary color, can signify time available to receive goods or services. For example, a client can designate +9 hours unavailable to provide work or receive services. In RGB formatting, this can mean that the circles from the +23:00 hour to the +08:00 are shades of green. From +08:00 to +16:00, the client can designate that they are available to provide goods or services. In RGB formatting, this can mean the corresponding circles are shades of yellow. Another color, blue, can be used to designate that the client is available to receive goods or services (the work of another). For the −7 hours from +16:00 to +23:00, the corresponding circles can be shades of blue.

Complementary colors are pairs of colors which, when combined, cancel each other out. Using additive colors of light as the guidepost, RGB formatted data can be synthesized according to a digital collimation so that complementary colors combine to signify white. Therefore, when complementary colors are matched, an indicia of a match is made and the complementary users are notified.

In an example complementary to FIG. 1, it is also possible to map global time where we can assign unique colors, or RGB formatting, one color for every (15) fifteen minutes in 24 (twenty four) hours across all (38) thirty eight time zones. Its complementary color is then assigned to make matches within the same time zone. The (96) ninety six Greenwich Mean Time colors can be a part of the color code. When a user such as a provider indicates the times that they can provide goods and services, those times can be RGB formatted complementary to the client RGB formatting. Returning to FIG. 1, it is possible for a provider of goods and services to have time overlapping the client of FIG. 1. For example, at hour +20:00, a provider could have an opening in their schedule to provide, for example, a work for hire writing service. A shade of yellow is used on the provider calendar, which is complementary to the blue used on the client calendar. Despite that the users are not co-located, it is possible for the client to know that the provider is available for hire. The synthesizing of the blue and yellow RGB formatted scheduling (WHEN) data results in a white pixel value. An indicia of a match can be forwarded to the client for acceptance. The global approach can be arranged so that users in different time zones can be matched. For example, a user in Tokyo can have a complementary RGB formatting as a user in Los Angeles. The user in Tokyo can hire or provide services to the user in Los Angeles. Matches can thus be made among users across all time zones.

The invention removes time as a barrier to accomplish one's goals. Mapping time in this manner, one can see the end of their day in their own time zone is the beginning of a new day in another time zone. This opens up the potential for several global team life/work balance structures. For example, a team of (3) three can perform a no-overlap work relay every eight hours. On the other hand, a team of (4) four can perform an eight hour day with a (2) two hour overlap on one end or (1) one hour overlap at either end of their work-day. In addition, several part-time work relay methods may be provided. As remote work has unexpectedly become an international norm, easy time synchronization between people with diverse lifestyles and schedules across multiple time zones will equally help work flows and work-life balance.

Early Birds and Night Owls can comfortably work at the same time in different time zones. Or, in the same time zone, an Early Bird can relay work to a Night Owl. Understanding time as a framework from which to view the movement of the earth, we can start to use the Earth's movement to our advantage. When combined with technology, we can improve our mobility and decrease the paralysis of procrastination.

Figure 2A:
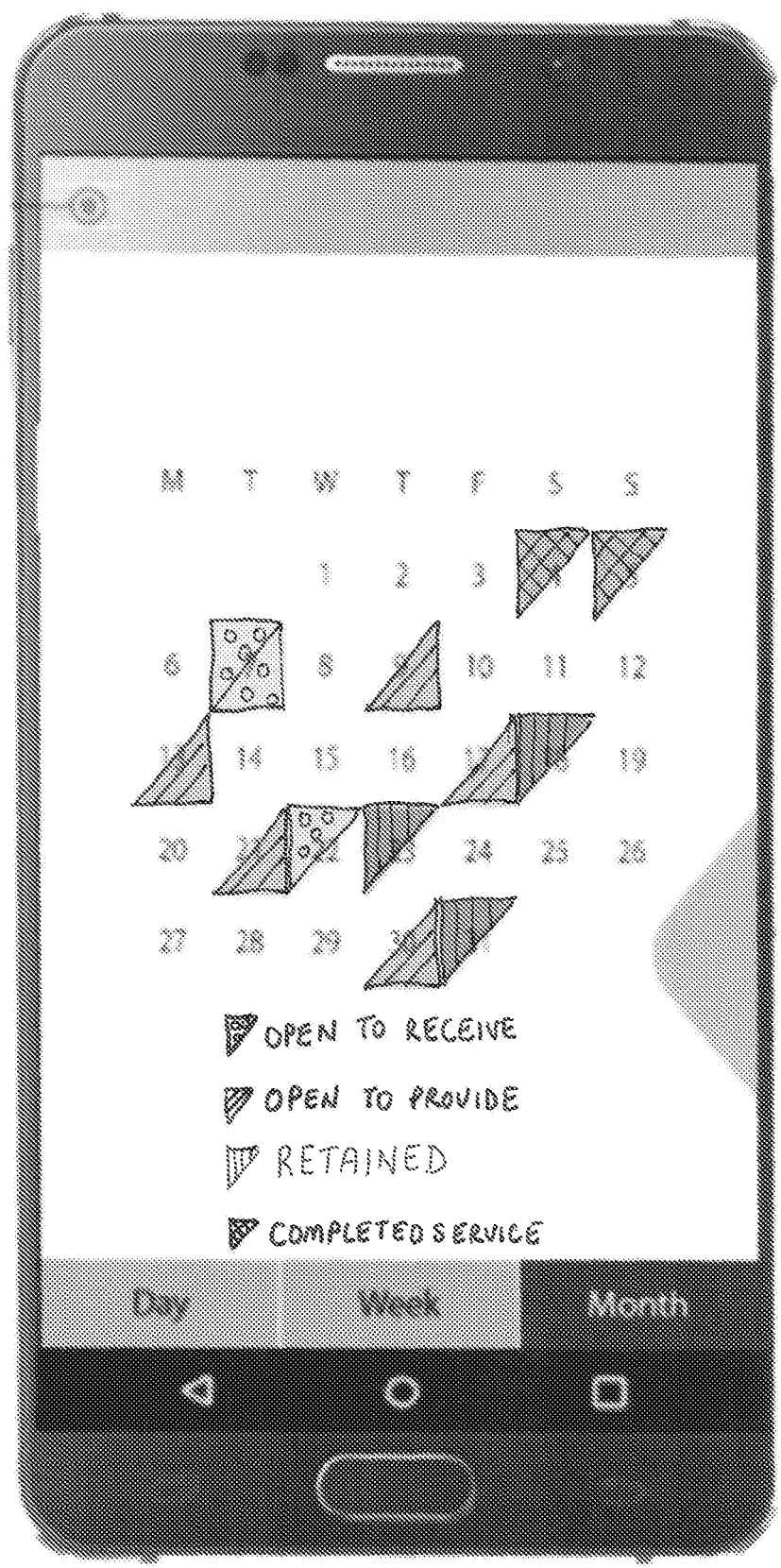
FIGS. 2A & 2B are views of a user device.
Figure 2B:
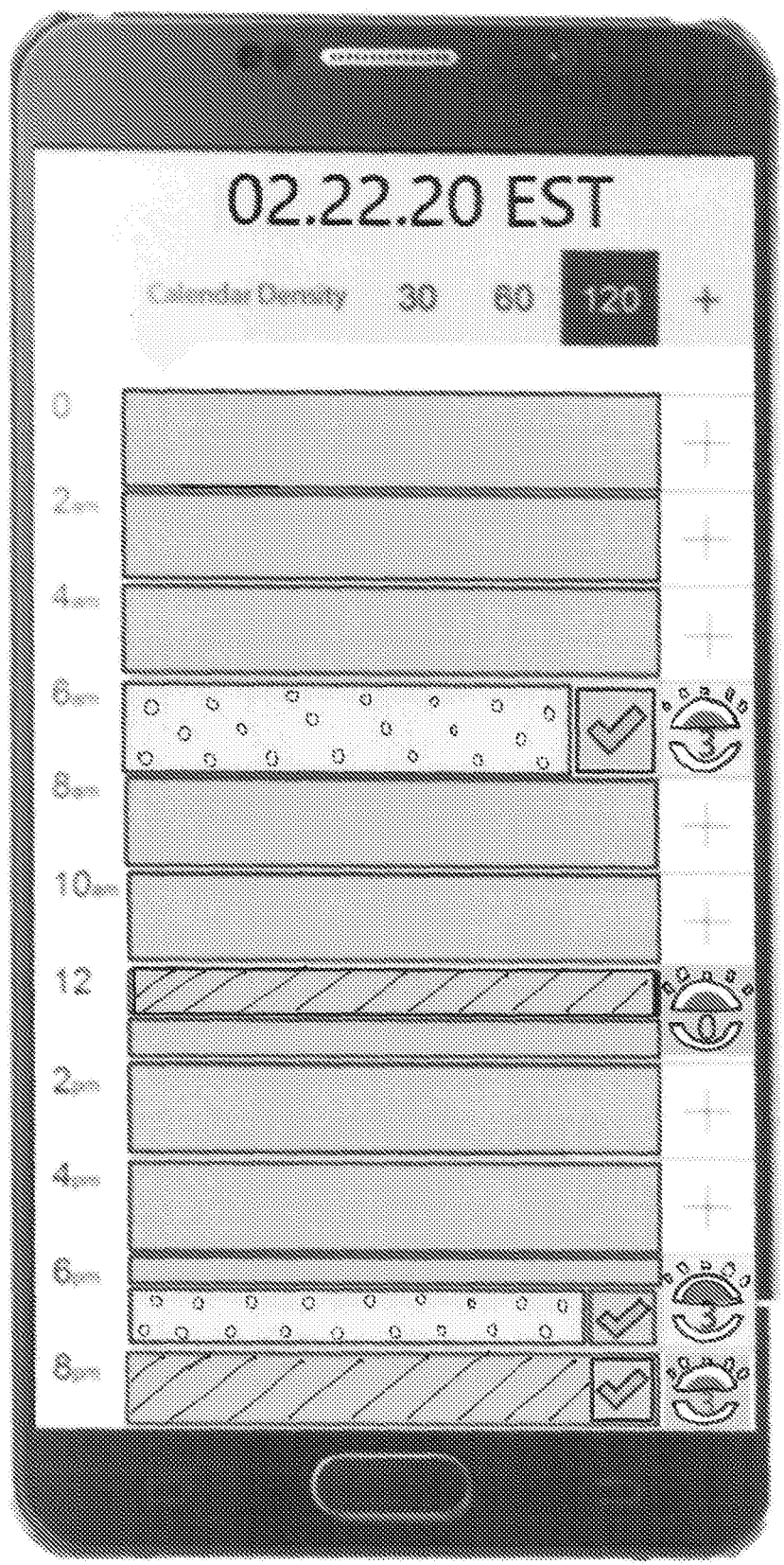

FIGS. 2A & 2B provide further explanation. Understanding that a user can be both a client and a provider, the device shown can be a user device or a provider device. Allocation programming, for example, can be used to separate the algorithmic processing discussed herein. For example, the memory device of the smartphone (or tablet, computer, or other network-ready device) can be partitioned to store client inputs as a client memory device and provider inputs and a provider memory device. The processor can be both a client processor and a provider processor algorithmically controlled. Stored client algorithms and stored provider algorithms can sort among the user inputs as either client inputs or provider inputs.

A combined calendar view is shown in FIG. 2A. The 4th & 5th days of the month indicate that the user has completed booked services. The 7th & 22nd days of the month indicate that the user is open to receive services from others. The 9th, 13th, 17th, 21st, & 30th days indicate that the user is available to provide services. The 18th, 23rd, & 31st days of the month indicate that the user is retained to provide services. The user interacts with input devices such as touchscreen, microphone, keyboard and other devices to provide scheduling data, including client scheduling data and provider scheduling data.

FIG. 2B builds on the notion in another visual format. This user input screen permits the user to choose the density at which time slots are filled. 6 am & 6:15 pm times slots are indicated as open to receive goods or services by color or other indicia. Openings to provide goods or services are given at 12 pm & 8 pm. An indicia of a match is given, comprising a sunburst. Three matches are available for most of the available time slots, while the 12 pm time slot does not have a match. So the user can select, as a client, among 3 providers, for receiving services and can select, as a provider among three clients. A check mark can indicate that the indicia of a match has been reviewed so as to begin a discard timer that counts-down to a data purging mode. A color change to red can indicate that a booking has been made. Other times in the user's calendar are not available to the network. The unavailable times can be locally saved so that the network does not comprise more knowledge of the user than necessary to receive or provide goods or services. Calendar integration can optionally be achieved so that locally or network saved calendar information (Outlook, iCal or Google Calendar, among others) is integrated with the illustrated user device calendars.

Users can participate in use of surveys, which the network can forward. This can facilitate the set-up of the user calendar. Client inputs and provider inputs can be received, stored and processed. Much of the processing can be done digitally in traditional manner.

The user inputs can include those indicating that the user is "open to suggestions." A time slot can be designated as open via client or provider access data, and a client or provider suggestion can be made with or without regard to other information about the user. Or, the client or provider access data can be combined with other information about the user to facilitate the finding of a suggested match.

The networked client device can be configured to bidirectionally communicate with the network. The client device can receive, store, and process client inputs in a client computing device comprising at least a client processor and a client memory device. The client inputs can comprise at least client request data, client access data, and client scheduling data that are digitally processed within the client computing device. Additional client inputs can comprise data collected via survey or other fillable forms.

The client request data (WHAT) can be derived from a list of things people procrastinate doing, or things that people need to schedule in advance. A survey can ask those who sign up if the following items are in the NEED category, WANT category, DREAM category, MAYBE category or NEVER category.

A corollary survey for provider request data can ask if the user could qualify as a provider of any of the services listed. If so, would they be interested in offering the service from their existing practice/office now, from an office in the future, from their home office and/or making "house calls" virtually or in person. Table 1 provides a ranking tool to sort survey data.

TABLE 1

Please review the following list of services and rate them from 1-5:

| | |
|---|---|
| 1 = NEVER | I do not see myself requesting this service now or in the future. |
| 2 = MAYBE | Perhaps, I've never really thought about it before. |
| 3 = NEED | I really need to do this. I don't want to, but I have to get it done. |
| 4 = WANT | I want to do this and am motivated to try and find away. |
| 5 = DREAM | I would love to have this service, but don't know how it's possible |

By way of example, only, and not as an exhaustive list, Table 2 provides example services. Additional services such as beauty, self-care, home maintenance, professional services, medical appointments, side-job work, networking, "bucket list" items, leisure activities, among others, can be included as part of the survey. Goods can be included in the survey, such as shopping, prescription refills, take-out, household items, among others.

TABLE 2

| Service to Schedule | Never | Maybe | Need | Want | Dream |
|---|---|---|---|---|---|
| Wake-up early- on time | 1 | 2 | 3 | 4 | 5 |
| Leave on time | 1 | 2 | 3 | 4 | 5 |
| Prep for work | 1 | 2 | 3 | 4 | 5 |
| Homework | 1 | 2 | 3 | 4 | 5 |
| Test Prep | 1 | 2 | 3 | 4 | 5 |
| Applications | 1 | 2 | 3 | 4 | 5 |
| Taxes | 1 | 2 | 3 | 4 | 5 |
| Take out the garbage | 1 | 2 | 3 | 4 | 5 |
| Do the dishes | 1 | 2 | 3 | 4 | 5 |
| Make a home cooked meal | 1 | 2 | 3 | 4 | 5 |
| Clean the house | 1 | 2 | 3 | 4 | 5 |
| Go workout | 1 | 2 | 3 | 4 | 5 |
| Do the laundry | 1 | 2 | 3 | 4 | 5 |
| Appointments | 1 | 2 | 3 | 4 | 5 |
| Running errands in general | 1 | 2 | 3 | 4 | 5 |
| Hair | 1 | 2 | 3 | 4 | 5 |
| Make-up | 1 | 2 | 3 | 4 | 5 |
| Car Maintenance | 1 | 2 | 3 | 4 | 5 |
| Car Washing/Detailing | 1 | 2 | 3 | 4 | 5 |
| Groceries | 1 | 2 | 3 | 4 | 5 |
| Toiletries | 1 | 2 | 3 | 4 | 5 |
| Doctor | 1 | 2 | 3 | 4 | 5 |
| Accountant | 1 | 2 | 3 | 4 | 5 |
| Hobbies- Art/Music/Writing/Sports | 1 | 2 | 3 | 4 | 5 |
| Learn a New Language | 1 | 2 | 3 | 4 | 5 |
| Concerts | 1 | 2 | 3 | 4 | 5 |
| Sports Events | 1 | 2 | 3 | 4 | 5 |
| Volunteer | 1 | 2 | 3 | 4 | 5 |
| Anniversaries | 1 | 2 | 3 | 4 | 5 |

Clients can prioritize things like finding a dog-walker so they leave for work on time; purchasing an alarm clock to wake up on time; scheduling dry cleaning delivery to leave for work on time, and so forth through the list.

Much like the spectral mapping for the time zones and location, the goods and services can likewise be RGB formatted. Client request data can be assigned pixel values per each request category. Providers can be assigned complementary pixel values based on their ability to satisfy that request category. RGB formatting allows 16 million unique color assignments for the pixel values.

Scheduling data can be associated with each request data of the users. A client can designate a yearly anniversary, a quarterly accountant consultation, a weekly laundry service, a bi-weekly meal service, among many others.

Of course accessibility is a limitation. Users travel the world over. Not all places are accessible to a user at all times for all purposes. It would be advantageous to practice as disclosed herein that a user schedule their presence in a location in advance. A client can now satisfy requests (WHAT) such as haircut or leisure activities despite being on travel. The RGB formatting makes it evident what providers are available in locations and times. Likewise, travelling providers can indicate availability so that they can book multiple clients on their trips. Now, a user can search for matches outside of their time zone and geographic home base with ease. Whereas prior art search systems get hung up on time zones, the RGB formatting and calendaring simplifies the visualization and optimization of a user's time. Instead of using time zone converters, local search syntax, international telephone dialing codes, currency converters, locality-restricted banking and credit systems, and all of the other human steps to access and verify the booking, the synthesizing database and collimating herein can seamlessly notify a user of a match. Client and provider survey results cut the chaff of incompatibility in ways that prior systems cannot accomplish. So, it is advantageous to further designate user and provider access data (WHERE).

In this global pandemic, users are not travelling or booking venues as in the past. However, performers and venues the world over are still available. A benefit of the global calendar is seeing that your availability indication results in matches in other locations (WHERE). By indicating that a user is open to virtual access, a user can book remote devices and access remote clients and providers. FIG. 9 provides such an example. An arena, stadium, theatre, planetarium, museum, zoo or other venue can comprise access areas such as standing rooms, seating areas, observation decks, or the like. A client can book a virtual seat or viewing device 9 at the location and remotely participate. Watching a baby panda, a sunset, an orchestra, ballet, or sporting game can be accomplished should the provider offer access points on viewing devices 9. FIG. 9 shows a seating arrangement 90 filled by socially-distanced users 19. Pricing schemas can be overlaid on the seating area for virtual or in-person seating. A virtual access point is provided by, in this instance, a seat-mounted viewing device 9. The viewing device can be ceiling or floor-mounted, among many other options. A user on one side of the globe can access a concert in another part of the world by accessing the viewing device 9.

Figure 3:
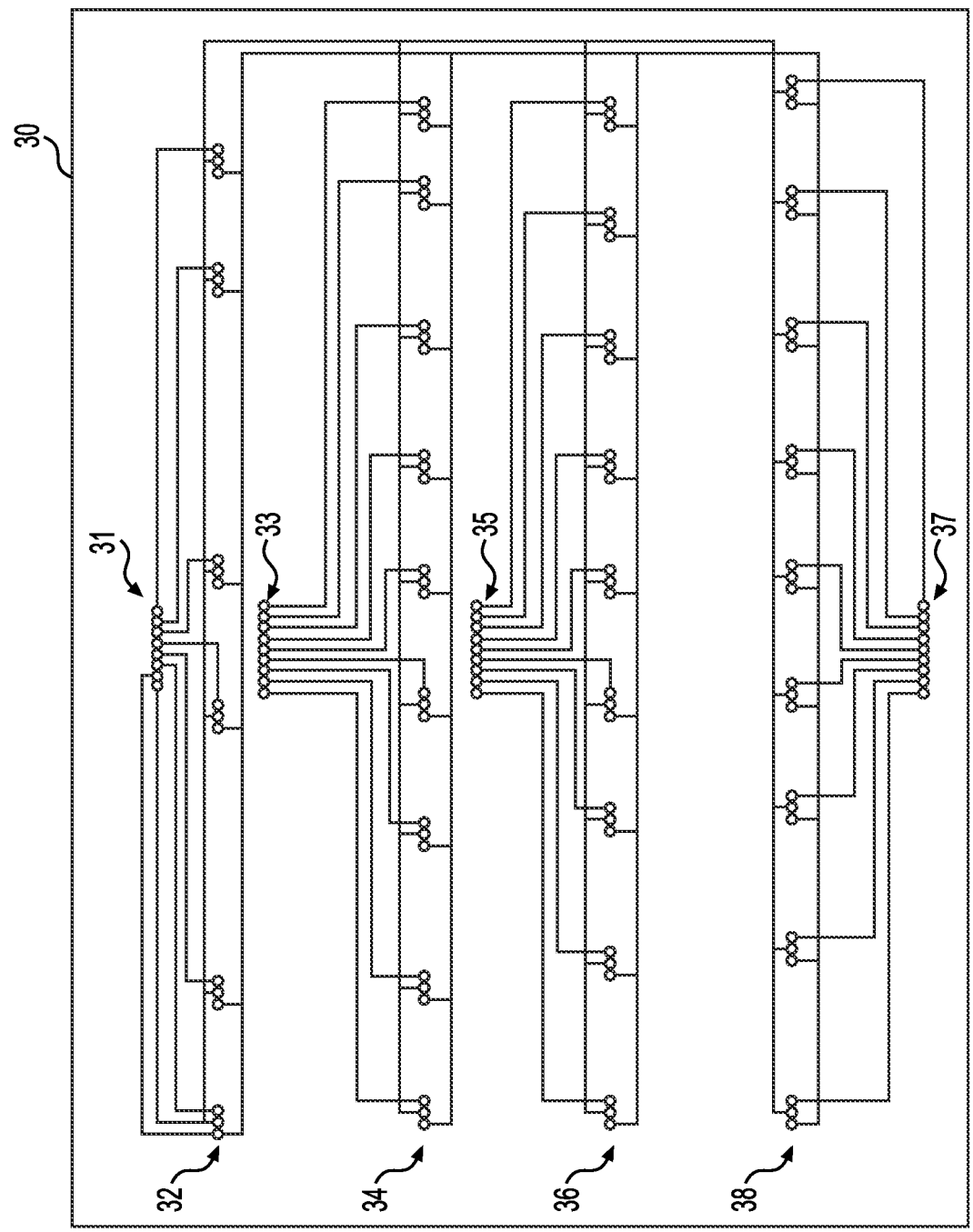
FIG. 3 is a representation of a finite state reader for survey data.

The use of surveys and other user input interfaces works in the RGB formatting schema because of the binary nature of user inputs. The user is either interested in a request (WHAT) or not. They are available (WHEN) or not. They are present in a location (WHERE) or not. Numerous types of finite state machines are compatible with the teachings herein. FIG. 3 shows one example of a finite state machine 30. User inputs such as client access data, client request data, and client scheduling data, among others, is input at cells 31, 33, 35, 37. The user inputs cause the selection of bundles of RGB pixel values in rows 32, 34, 36, 38. Some user inputs carry down to other lines. For example, a client request data client input could cause a specific red client request data pixel to be applied to the cascading rows. Other inputs such as merit data, language data, cost data, credential data, ratings data, among others, can be input with the client access data and client scheduling data to create a resume of sorts that the client wants the provider to satisfy. As an example, a client could input "pet services" as client request data in the user device. Now, a particular decision tree ensues for the time, location, credentials, type of pet service, among others. The rows can organize client inputs for the "pet services" request as the user selects among veterinarians, groomers, walkers, sitters, etc. As a final output, a row of red data, a row of blue data, and a row of green data is formulated for the user input.

Providers, as complementary users, likewise enter provider inputs with complementary details showcasing what they offer (provider request data), when they are available (provider scheduling data), and where there services or goods are offered (provider access data). Merit, language, cost, credential, ratings and other data can also be entered. As a final output, a row of red data, a row of blue data, and a row of green data is formulated for the provider input.

As discussed above, the pixel values of the RGB formatting is designed to result in complementary combinations of pixel values so that when a user is looking for a specific provider, that provider has pixel values that result in a white pixel value when the user RBG formatted data is collimated with the provider RGB formatted data. Or, in the case of the survey in Table 1, the provider can be within a range of satisfying the client wants and needs. Non-white pixel values can be within a calculable range and still satisfy the user parameters.

Figure 4:
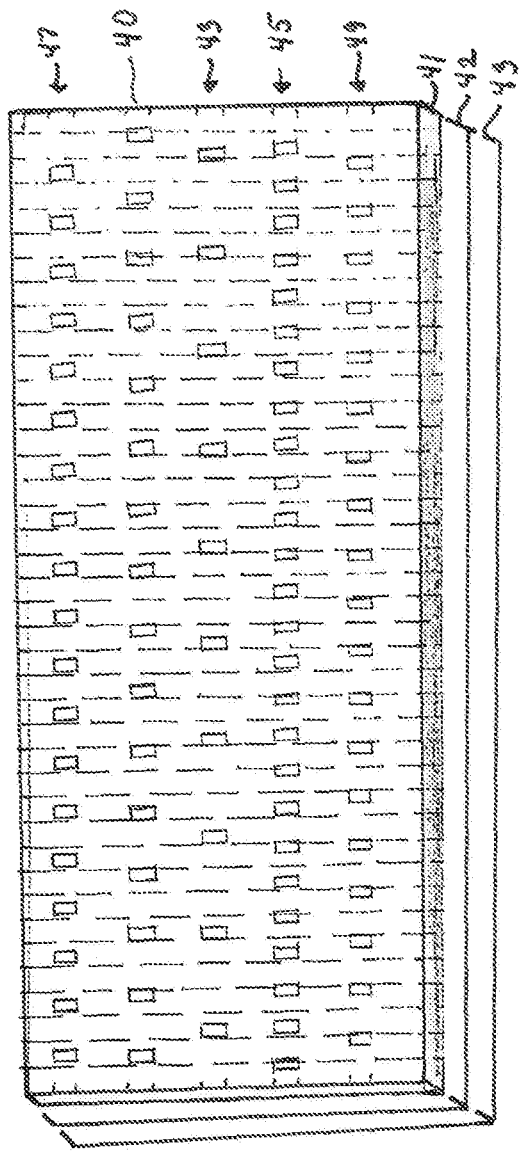
FIG. 4 is a representation of a synthesizing database.

To visualize the synthesizing of user inputs and provider inputs, a representation of a lens 40 is shown in FIG. 4. An upper lens 41 could be akin to a collimating lens of red pixel values. A middle lens 42 could be akin to a collimating lens of green pixel values. A bottom lens 43 could be akin to a collimating lens of blue pixel values. In a true optical system, when the red, blue and green wavelengths add, white light results. Similarly for the lens 40, when red, blue, and green pixel values are summed, a white or black cell can result. Rows 47 & 49 have the most similarities. If row 47 represented a client and row 49 represented a provider, it could be logical to forward an indicia of a match to a client device. Rows 43 & 45 would comprise too many dissimilar collimated pixel values to forward.

Figure 5:
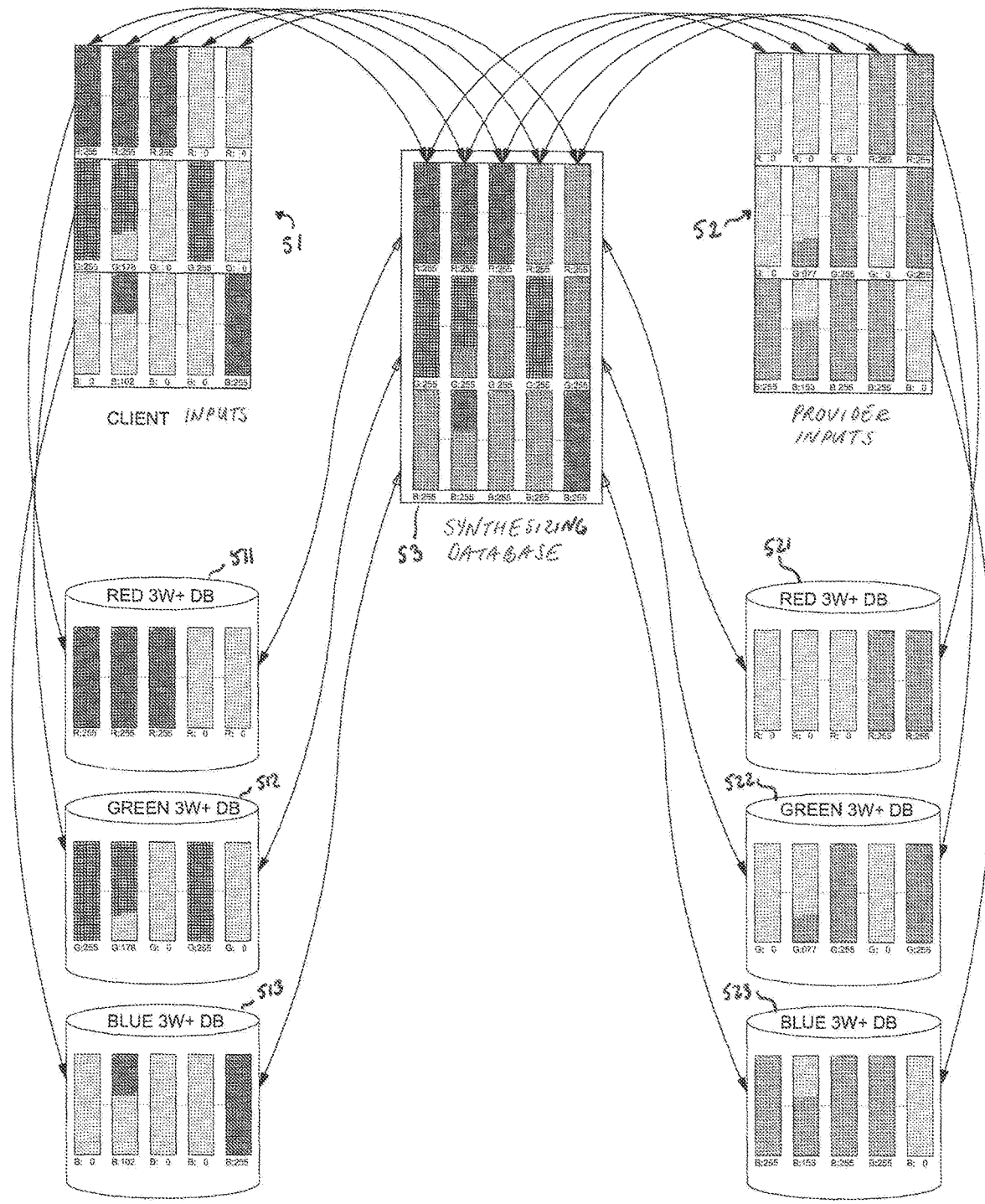
FIG. 5 is a schematic of RGB formatted client inputs, RGB formatted provider inputs, and synthesized data comprising collimated pixel values.
Figure 6A:
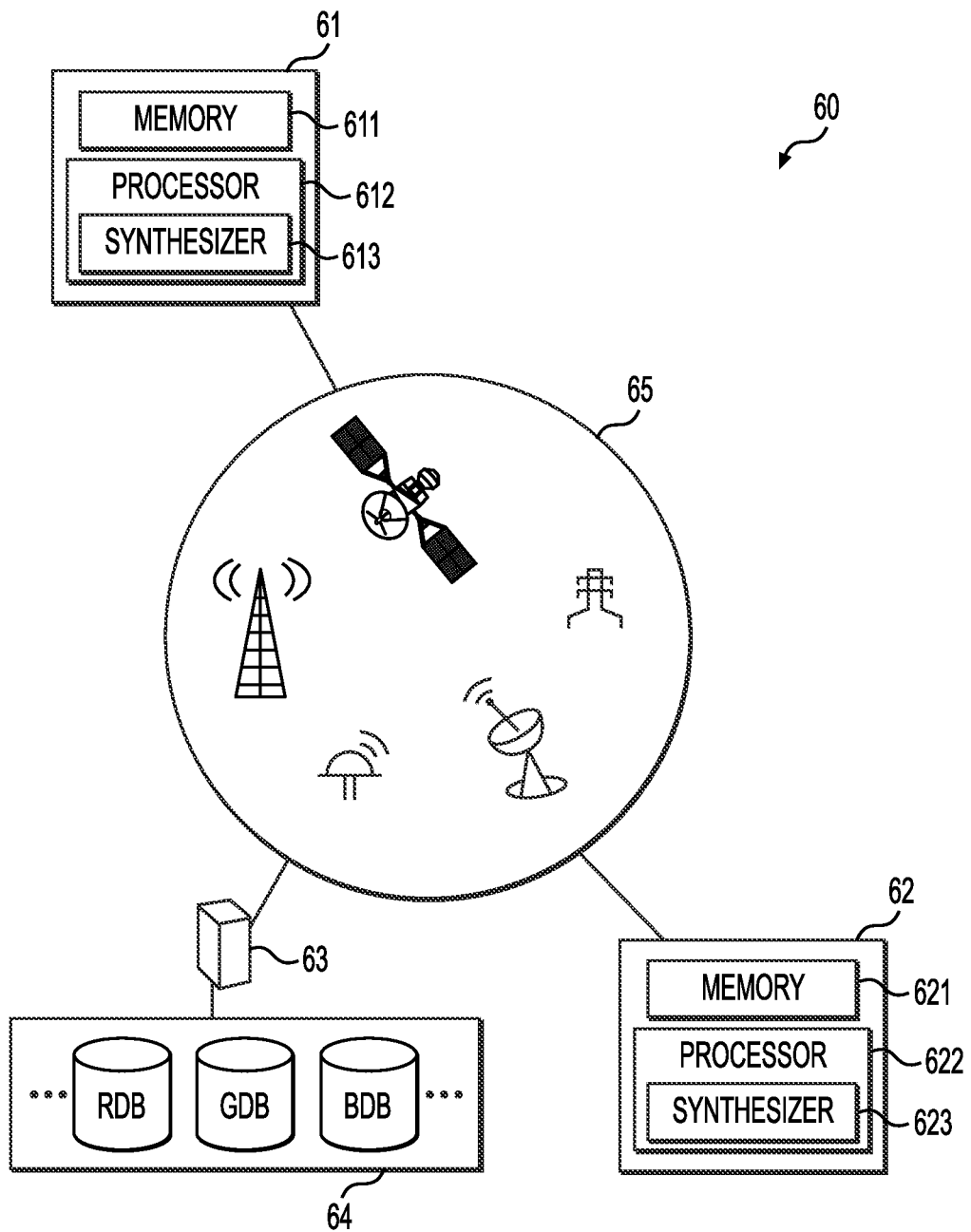
FIGS. 6A & 6B show aspects of bidirectional communication networks.
Figure 6B:
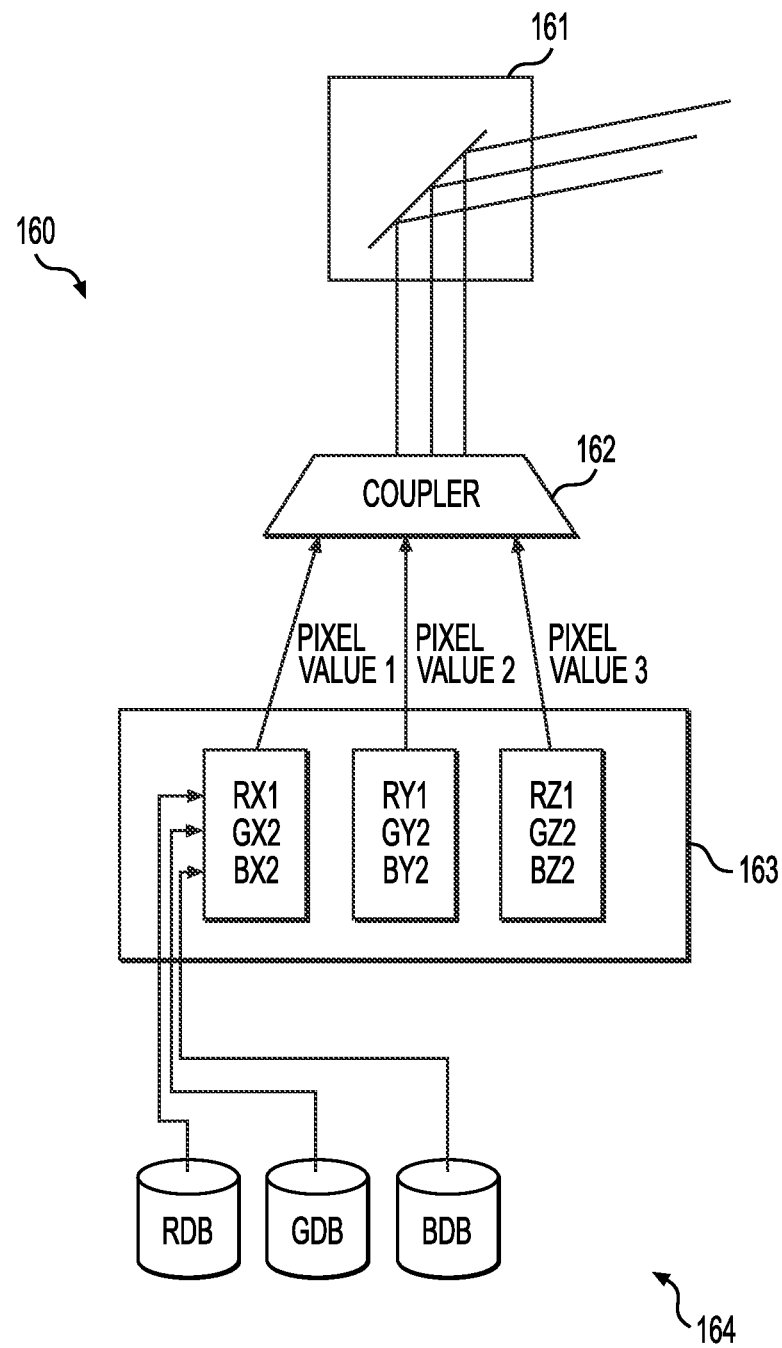

FIGS. 5, 6A, & 6B provide other schematics for visualizing the client inputs and provider inputs. In FIG. 5, the client has inputted by a smartphone, computer keyboard or touchscreen or other input device various client inputs, including the 3Ws. Five client inputs 51 are illustrated. For the sake of explanation, the client inputs 51 can be client request data, client access data, client scheduling data, merit data, and language data, though other client inputs can be substituted, added, or removed. The client device 61 processes the client inputs 51 in the processor 612 with a stored client algorithm from the stored memory device 611. The stored client algorithm is configured to convert the client inputs 51 into rows of client data columns comprising transcoded RGB formatting of the client inputs. For the sake of explanation, client request data can comprise red pixel value 255, green pixel value 255, and blue pixel value 0. Client access data can comprise red pixel value 255, green pixel value 178, and blue pixel value 102. Client scheduling data can comprise red pixel value 255, green pixel value 0, and blue pixel value 0. Merit data can comprise red pixel value 0, green pixel value 255, and blue pixel value 0. Language data can comprise red pixel value 0, green pixel value 0 and blue pixel value 255. These client inputs 51 having received RGB formatting, can be stored in client data rows of separate client databases 511, 512, 513 in the memory device 611 of client device 61 or can be stored client data rows in the database array 64 of the network 60. It can be said that at least a request column receives each of the pixel values for the RGB formatted client request data such that a red client request data pixel is stored in the red client data row, a green client request data pixel is stored in the green client data row, and a blue client request data pixel is stored in the blue client data row.

The client data rows comprise at least a red client data row in red client database 511 or red database RDB, a green client data row in green client database 512 or green database GDB, and a blue client data row in blue client database 513 or blue database BDB. It can be said that each of the client request data, the client access data, and the client scheduling data comprise pixel values in the rows of client data columns corresponding to each of the red client data row, the green client data row, and the blue client data row. The use of pixels values and RGB formatting offers a unique security of the client inputs. Should any one of the client databases 511-513 or network databases RDB, GDB, or BDB be hacked or otherwise compromised, the data in that database is useless to the hacker without the corresponding other pixel values. All of the client databases 511-513 would need to be hacked simultaneously. Or all of the network databases RDB, GDB, or BDB would need to be hacked simultaneously for any useful information to be gleaned.

As indicated by the double-headed arrows in FIG. 5, the client inputs 51 can be stored in the client databases of memory 611 or network databases 64 for later processing. Or, a direct feed of the client inputs can be made to the synthesizing database 53. Synthesizing database 53 can be formed within processor 612 to perform the function of the lens 40. It is designed to collimate the client inputs 51 with the provider inputs 52 to confirm when a match of client and provider occurs. Synthesizing database 53 is shown in FIG. 5 to have all white pixel values indicative of a perfect client and provider match.

Many aspects of the provider inputs 52 can be processed similarly in the provider device 62. The network 60 can comprise the provider device 62 configured to bidirectionally communicate with the network 60. The provider device 62 can digitally receive, store, and process provider inputs 52 in a provider computing device comprising at least a provider processor 622 and a provider memory device 621. The provider inputs 52 can comprise at least provider request data, provider access data, and provider scheduling data that can be complementary to client inputs 51.

The provider device 52 can process the provider inputs 52 in the provider processor 622 with a stored provider algorithm stored in the provider memory device 621. The provider algorithm can be configured to transcode digital provider inputs received from a touchscreen, keyboard, or other provider input device into provider RGB formatted data. Such transcoding can be done directly on the provider device 62 so that the provider inputs have the RGB-related security features applied to the client inputs 51. Alternatively, it is possible to forward the digital provider inputs 52 to the server 63 for RGB formatting and distribution in the database array 64.

For the sake of explanation, provider request data can comprise red pixel value 0, green pixel value 0, and blue pixel value 255. So, it can be said that the provider request data comprises a red provider request data pixel, a green provider request data pixel, and a blue provider request data pixel. Provider access data can comprise red pixel value 0, green pixel value 77, and blue pixel value 153. So, it can be said that the provider access data comprises a red provider access data pixel, a green provider access data pixel, and a blue provider access data pixel. Provider scheduling data can comprise red pixel value 0, green pixel value 255, and blue pixel value 255. So, it can be said that the provider scheduling data comprises a red provider scheduling data pixel, a green provider scheduling data pixel, and a blue provider scheduling data pixel. Merit data can comprise red pixel value 255, green pixel value 0, and blue pixel value 255. Language data can comprise red pixel value 255, green pixel value 255, and blue pixel value 0. These provider inputs 52 having received RGB formatting, can be stored in provider data rows of separate provider databases 521, 522, 523 in the memory device 621 of provider device 62 or the RGB formatted provider inputs can be stored in provider data rows in the database array 64 of the network 60.

In the instance of FIG. 6A, the provider device 62 is configured to communicate with the database array 64 via the network 60. The provider device 62 is configured to communicate the red provider request data pixel, the red provider access data pixel, and the red provider scheduling data pixel to a red data database RDB of the database array 64 at a first network spectrum. That is, the provider device 62 can be configured with a variety of bidirectional communication tools. A communication cloud is shown generally at 65. Icons for various communication network spectrums are shown, including satellite, wireless such as 4G or 5G, laser, radar, and traditional wireline. As a security measure for both provider device communications and client device communications, each of the rows of data for transmission across the network can be done by the client device 61 and provider device 62 at a different network spectrums (fiber optic, telephone, wireless, WIFI, etc.). As an alternative, only one of the red, green, or blue rows are transmitted at a different network spectrum while the other two rows use the same network spectrum.

To continue the example, the green provider request data pixel, the green provider access data pixel, and the green provider scheduling data pixel are transmitted to a green data database GDB of the database array 64 at a second network spectrum. And, the blue provider request data pixel, the blue provider access data pixel, and the blue provider scheduling data pixel are transmitted to a blue data database BDB of the database array 64 at a third network spectrum. The network 60 can be configured so that the first network spectrum differs from the second network spectrum and from the third network spectrum, and the second network spectrum differs from the third network spectrum.

Likewise, the database array can be configured to bidirectionally communicate with the client device 61 via the communication cloud 65 of the network 60. The client device 61 can communicate the RGB formatted client inputs 51 to the red data database at a fourth network spectrum, to the green data database at a fifth network spectrum, and to the blue data database at a sixth network spectrum. The client network spectrums can differ from the provider network spectrums.

In order to find a match between client and provider, it is necessary to search the provider database arrays, whether stored in provider data rows of separate provider databases 521, 522, 523 in the memory device 621 of provider device 62 or whether stored in provider data rows in the database array 64 of the network 60. The database arrays are further configured to bidirectionally communicate with the client device 61 via the communication cloud 65 of network 60. The client device can be configured to communicate client inputs comprising at least client request data RGB formatted to comprise the red client request data pixel, the green client request data pixel, and the blue client request data pixel; client access data RGB formatted to comprise a red client access data pixel, a green client request data pixel, and a blue client request data pixel; and client scheduling data RGB formatted to comprise red client scheduling data pixel, a green client scheduling data pixel, and a blue client scheduling data pixel. Commensurate with the above security measure, it is possible to transmit all red client data pixels as a single stream, transmit all green client data pixels as a separate second stream, and transmit all blue client data pixels as a third separate stream. Each of the streams can be at a different network spectrum. The database array can be configured to compare the client inputs to the provider inputs to search the database array for complementary pixel values that sum to white pixel values. It is alternatively possible to search for pixel values within a range.

The database array can be further configured to communicate the provider inputs 52, as RGB formatted data, to the client device 61 when the provider request data is a complementary RGB format to the client request data, the provider access data is a complementary RGB format to the client access data, and the provider scheduling data is a complementary RGB format to the client scheduling data.

As described in FIG. 2B, the client device 51 receives the notification of a match a displays an indicia of a match to the user. In the example, a sunburst is shown along with the number of matches returned. The user can click-through and view provider data. A checkmark can be applied as an indicia that the match results have been reviewed. Once reviewed, a timer can run. When the timer runs out, the memory device 61 is alleviated of the provider data affiliated with the match. But, if the user device 61 receives acceptance data from the user indicating client acceptance of the complementary provider request data, provider access data, and provider scheduling data, the client acceptance data is forwarded to the provider device 62. This constitutes a booking. The provider request data, the provider access data, and the provider scheduling data can be deleted from the database array as they pertain to that booking. Much of the client inputs 51 can remain on the client device as a safety mechanism for the client. Limited client information, such as initial deposit, could be transmitted to the provider device 62 to confirm the booking at the provider. Personally identifying information can be withheld until needed to complete the booking, such as during ticket pickup, check-in, or final sale.

Returning to aspects of the synthesizing database 53, it can be said that the client device 61 is configured to receive, store & process network inputs in its computing device. The network inputs can be the provider inputs as forwarded through the communication cloud 65 whether directly from the provider 62 or whether from the database array 64. The processor 612 comprising synthesizer 613 can receive network inputs comprising at least provider request data, provider access data, and provider scheduling data. The client device 61 at synthesizer 613 processes the network inputs in the client processor. The client algorithm is configured to correlate the network inputs into rows of provider data columns in the synthesizing database 53, the rows of provider data columns comprising RGB formatting of the network inputs. The synthesizer can synthesize the rows of client data columns with the rows of provider data columns comprising collimating the RGB formatted network inputs with the RGB formatted client inputs to result in a row of collimated pixel values. It is possible to discard the row of collimated pixel values when the row of collimated pixel values comprises one or more pixel value outside of a predetermined range of pixel values or when the row of collimated pixel values comprises one or more non-white pixel values. The processor, via the client algorithm, can display an indicia of a match on the client display device when the row of collimated pixel values collimates within the predetermined range or when the row of collimated pixel values collimates to all white pixel values.

In the alternative, the client device 61 is further configured to receive, store, and process network inputs in its computing device. The network inputs can comprise transcoded RGB formatted provider inputs comprising at least provider request data, provider access data, and provider scheduling data. The transcoding occurs when the digital representation of the user inputs are replaced with the RGB formatted representation of pixel values. The client device processes the network inputs in the client processor 612 with the client algorithm configured to convert the network inputs into rows of provider data columns in the synthesizing database 53, the rows of provider data columns comprising RGB formatting of the network inputs. The provider data rows comprise at least a red provider data row, a green provider data row, and a blue provider data row. Each of the provider request data, the provider access data, and the provider scheduling data comprise pixel values in the rows of provider data columns corresponding to each of the red client data row, the green client data row, and the blue client data row. At least the request column receives each of the pixel values for the RGB formatted provider request data such that a red provider request data pixel is stored in the red provider data row, a green provider request data pixel is stored in the green provider data row, and a blue provider request data pixel is stored in the blue provider data row. This alternative is conducive to the client algorithm being further configured to collimate the column of RGB formatted client request data with the column of RGB formatted provider request data to form collimated request data. It is possible to discard the collimated request data when it forms a non-white pixel value. Or, when the collimated request data forms a white pixel value, it is possible to store the collimated request data and display an indicia of a match on a client display device. Similar to the provider input data clean-up, it is possible to configure the client algorithm to discard the stored collimated request data if no indicia of client acceptance is received. Or, when the client inputs acceptance data, it is possible to forward the acceptance data to the network 60 and delete the client request data from the request column.

As above, the client inputs can be stored as RGB formatted on the client device 61 in client databases 511-513 and the provider inputs can be stored as RGB formatted on the provider device 62 in provider databases 521-523. Alternatively, a database array 64 can comprise: a red data database RDB for storing red RGB formatted client inputs and red RGB formatted provider inputs; a green data database GDB for storing green RGB formatted client inputs and green RGB formatted provider inputs; and a blue data database BDB for storing blue RGB formatted client inputs and blue RGB formatted provider inputs. Regardless of the storage technique employed, it is possible to configure a network processor such as server 63 to execute a spectrum shift across the database array 64, and across each of the client databases 511-513 and provider databases 521-523. The spectrum shift can comprise adjusting the RGB formatted client inputs by a client spectrum offset and adjusting the RGB formatted provider inputs by an opposite provider spectrum offset. For example, each pixel value related to client inputs can be increased by 5 while each pixel value related to the provider inputs can be decreased by 5. This could result in client request data changing the red pixel value from 255 to 4, the green pixel value from 255 to 4, and the blue pixel value from 0 to 5. The provider request data can change the red pixel value from 0 to 251, the green pixel value from 0 to 251, and the blue pixel value from 255 to 250. Extrapolating the technique, the red pixel values could be changed by one spectrum offset amount, the green pixel values could be changed by a different spectrum offset amount, and the blue pixel values could be changed by a third different spectrum offset amount.

The network device 160 of FIG. 6B is particularly conducive to the spectrum shift technique. This network device 160 is configured for optical communication. It can be either a client device or a provider device, and for brevity will be referred to as a user device. The user inputs are readily RGB formatted and stored in the corresponding red database RDB, green database GDB, and blue database BDB of database array 164. Database array 164 can be internal to the network device 160. A transmission synthesizer 163 combines the user request data by collimating user request pixels RX1, GX1, & BX3 to yield a first pixel value 1. User access data yields second pixel value 2 by collimating user access pixels RY1, GY2, BY2. User scheduling data yields third pixel value 3 by collimating scheduling data pixels RZ1, GZ2, & BZ2. A coupler 162 can transform the resulting first pixel value 1, second pixel value 2, and third pixel value 3 into transmissible light values that can be transmitted, for example, via dense wave division multiplexer (DWDM) 161 across an optical network. The spectrum shift technique can be applied to the pixels in the database array 164 as easily as it could be applied to the wavelengths transmitting the first through third pixel values 1-3. When combined with the teachings of FIG. 9, a particularly advantageous combination results. The network device 160 can be used as the viewing device 9 and part of the provider's stadium seating arrangement, for example. During an event, the network device 160 can share the event with client. After the event, the optical DWDM-capable device can form an optical communication network akin to a telecom closet within the event space. Now the provider viewing device 9 is a source of active revenue during events and is a source of passive telecommunication revenue when the venue is not being used.

Returning to the concepts of pixel spectrums, as noted above, it is possible to select among 16 million pixel values. So, the client algorithm can be configured to transcode the client request data to RGB formatting by mapping the client request data to a request pixel spectrum and assigning a request pixel value from the request pixel spectrum. When receiving the client request data, it can be possible to at least collecting frequency data and category data as coordinates of the mapping. As above, frequency data can comprise how often the request will be fulfilled and the category can be any enumerated category in Table 2, among others. It is possible to assembly a database of pixel values correlating to the categories of providers. Then, commensurate with the alternative security measures, it can be possible to shift the request pixel spectrum equivalent to a wavelength value across its coordinates according to a shift timing. Much like the spectrum shift discussed above, the database of provider request data can be adjusted to secure the provider request data, with corresponding spectrum shift of the client request data.

Figure 7C:
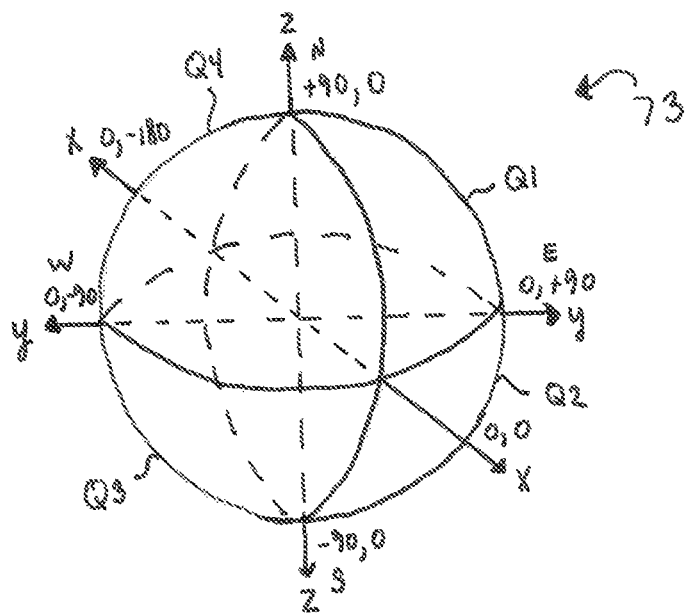
Figure 7C:
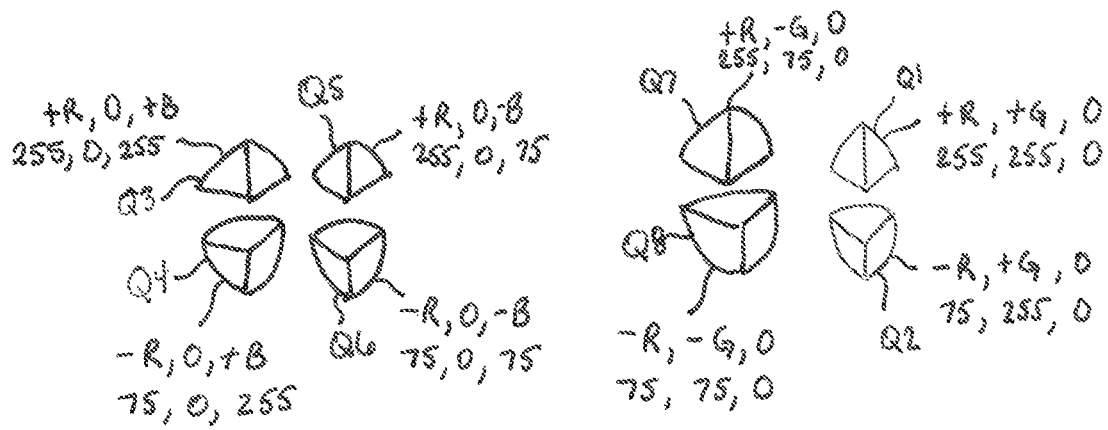

FIGS. 7A-7C assist with an understanding of complementary pixel values and spectrum shifting as it pertains to access (WHERE) data. The client algorithm can be further configured to transcode the client access data to RGB formatting by mapping the client access data to an access pixel spectrum and assigning an access pixel value from the access pixel spectrum. In the example of FIGS. 7A & 7B, an icosahedron is used as a tool for representing the globe in a convenient coordinate system. If folded along the major lines, the 2-dimensional representation could be folded into a 3-dimensional object also known as a "Bucky Ball." Locations around the globe are correlated to the coordinate system, including the equator, prime meridian, north pole, and south pole. The client geodesic matrix 71 comprises a first color scheme. RGB pixel values are assigned distinctly across the globe, with 16 million options available. The provider geodesic matrix 72 has a complementary color scheme so that when a client requests to access a provider be in a particular place, the alignment of the location data (WHERE) yields a white or near white pixel value from the collimation of the pixel values. This coordinate system is likewise conducive to the spectrum shift for client and provider data safety.

In FIG. 7C, a Cartesian coordinate system is used in lieu of an icosahedron. Now, the globe is divided along X, Y, & Z axis. Eight quadrants Q1-Q8 are shaded with RGB pixel values. This coordinate system is likewise conducive to the spectrum shift for client and provider data safety.

In both coordinate systems, icosahedron and Cartesian, it is possible to map clients to RGB pixel values. And, then map the providers to complementary RGB pixel values. When receiving the client access data and the provider access data, it can be possible to at least collect location data of the user and provider and correlate the location data to latitude data and longitude data as coordinates of the mapping.

Figure 8:
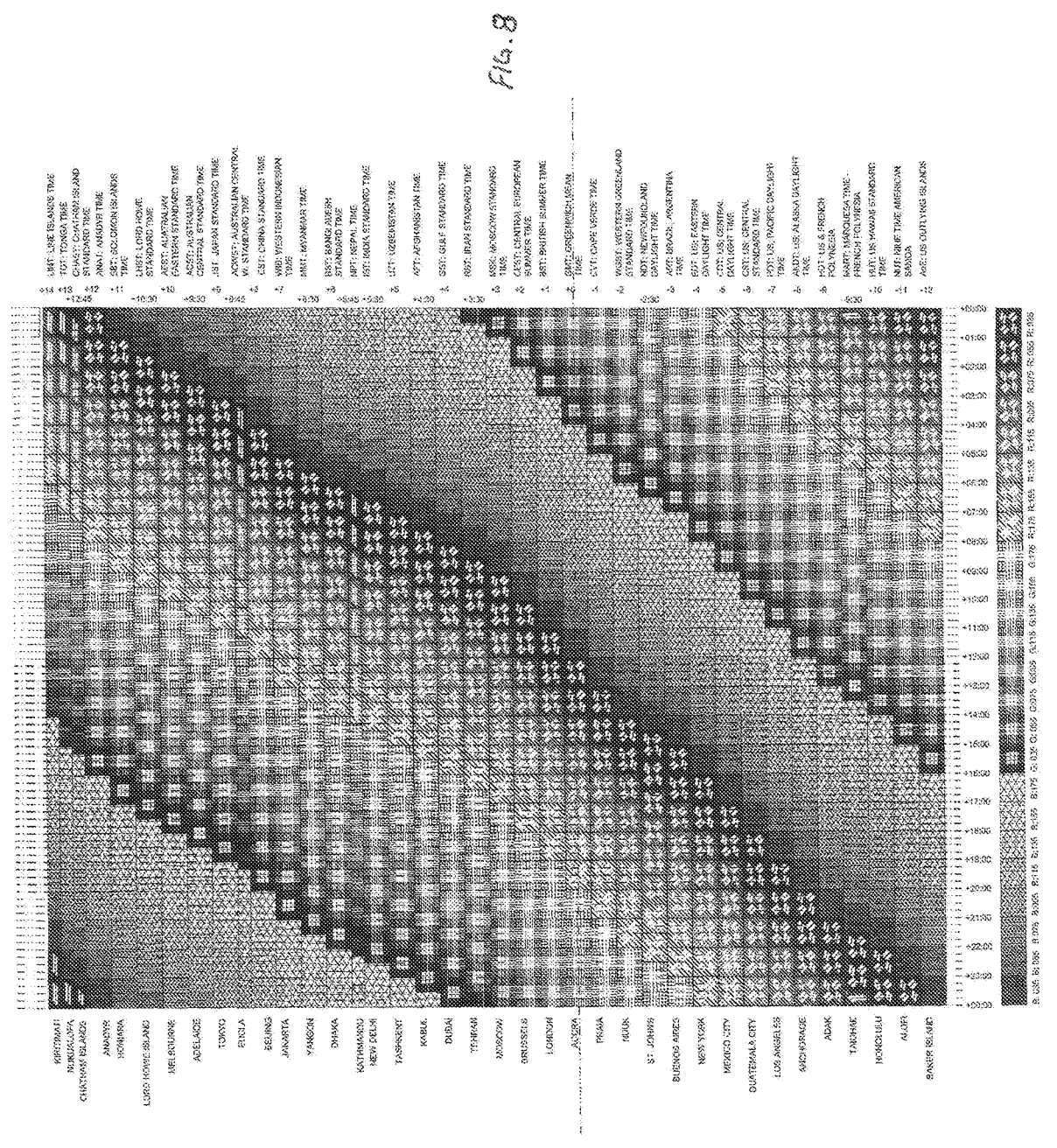

As we began with time (WHEN), FIG. 8 returns to concepts of time. Like the other data, scheduling data can be RGB formatted. It can be possible to transcode the client scheduling data to RGB formatting by mapping the client scheduling data to a scheduling pixel spectrum and assigning a scheduling pixel value from the scheduling pixel spectrum. FIG. 8 shows a client scheduling pixel spectrum. By inverting the color scheme shown in the key, it can be possible to create a provider scheduling pixel spectrum. This coordinate system is likewise conducive to the spectrum shift for client and provider data safety. When receiving the client scheduling data, it can be possible to collecting at least one of a start time, a stop time, and a duration as additional coordinates of the mapping. As illustrated in FIG. 2B, a user can control the granularity of their 3Ws-5 minutes, 15 minutes, 1 hour, 5 miles, 15 meters, 1 block, one week, bimonthly, yearly. The granularity selected can impact the range of pixel values applied per coordinate system. The granularity can also impact the prioritization of the W selection (WHAT, WHERE, or WHEN).

Other implementations will be apparent to those skilled in the art from consideration of the specification and practice of the examples disclosed herein.

What is claimed is:
1. A network, comprising:
a client device configured to:
bidirectionally communicate with the network; and
receive, store, and process client inputs in a client computing device comprising at least a client processor and a client memory device,
wherein the client inputs comprise at least client request data, client access data, and client scheduling data that are digitally processed within the client computing device, and
wherein the client device processes the client inputs in the processor with a stored client algorithm from the stored memory device, the stored client algorithm configured to convert the client inputs into rows of client data columns in a synthesizing database stored in the memory device, the client data rows comprising transcoded RGB formatting of the client inputs comprising at least a red client data row, a green client data row, and a blue client data row, and
wherein each of the client request data, the client access data, and the client scheduling data comprise pixel values in the rows of client data columns corresponding to each of the red client data row, the green client data row, and the blue client data row.

2. The network of claim 1, wherein at least a request column receives each of the pixel values for the RGB formatted client request data such that a red client request data pixel is stored in the red client data row, a green client request data pixel is stored in the green client data row, and a blue client request data pixel is stored in the blue client data row.

3. The network of claim 1, wherein:
the client device is further configured to receive, store & process network inputs in the computing device, the network inputs comprising at least provider request data, provider access data, and provider scheduling data, and
the client device processes the network inputs in the client processor with the client algorithm configured to:
correlate the network inputs into rows of provider data columns in the synthesizing database, the rows of provider data columns comprising RGB formatting of the network inputs;
synthesize the rows of client data columns with the rows of provider data columns comprising collimating the RGB formatted network inputs with the RGB formatted client inputs to result in a row of collimated pixel values; and
discard the row of collimated pixel values when the row of collimated pixel values comprises one or more pixel value outside of a predetermined range of pixel values; or
when the row of collimated pixel values collimates within the predetermined range, store the row of collimated pixel values and display an indicia of a match on a client display device.

4. A network, comprising:
a client device configured to:
bidirectionally communicate with the network;
receive, store, and process client inputs in a client computing device comprising at least a client processor and a client memory device; and
receive, store & process network inputs in the computing device, the network inputs comprising at least provider request data, provider access data, and provider scheduling data,
wherein the client inputs comprise at least client request data, client access data, and client scheduling data that are digitally processed within the client computing device, and
wherein the client device processes the client inputs in the processor with a stored client algorithm from the stored memory device, the stored client algorithm configured to convert the client inputs into rows of client data columns in a synthesizing database stored in the memory device, the client data rows comprising transcoded RGB formatting of the client inputs, and the client device is configured to process the network inputs in the client processor with the client algorithm configured to:

correlate the network inputs into rows of provider data columns in the synthesizing database, the rows of provider data columns comprising RGB formatting of the network inputs;

synthesize the rows of client data columns with the rows of provider data columns comprising collimating the RGB formatted network inputs with the RGB formatted client inputs to result in a row of collimated pixel values; and discard the row of collimated pixel values when the row of collimated pixel values comprises one or more non-white pixel values; or when the row of collimated pixel values collimates to all white pixel values, store the row of collimated pixel values and display an indicia of a match on a client display device.

5. The network of claim 2, wherein:

the client device is further configured to receive, store, and process network inputs in the computing device, the network inputs comprising transcoded RGB formatted provider inputs comprising at least provider request data, provider access data, and provider scheduling data, and the client device processes the network inputs in the client processor with the client algorithm configured to:

convert the network inputs into rows of provider data columns in the synthesizing database, the rows of provider data columns comprising RGB formatting of the network inputs, wherein the provider data rows comprise at least a red provider data row, a green provider data row, and a blue provider data row, wherein each of the provider request data, the provider access data, and the provider scheduling data comprise pixel values in the rows of provider data columns corresponding to each of the red client data row, the green client data row, and the blue client data row, and wherein at least the request column receives each of the pixel values for the RGB formatted provider request data such that a red provider request data pixel is stored in the red provider data row, a green provider request data pixel is stored in the green provider data row, and a blue provider request data pixel is stored in the blue provider data row.

6. The network of claim 5, wherein the client algorithm is further configured to:

collimate the column of RGB formatted client data with the column of RGB formatted provider request data to form collimated request data;

discard the collimated request data when it forms a non-white pixel value; or when the collimated request data forms a white pixel value, store the collimated request data and display an indicia of a match on a client display device.

7. The network of claim 6, wherein the client algorithm if further configured to:

discard the stored collimated request data if no indicia of client acceptance is received; or when the client inputs acceptance data, forward the acceptance data to the network and delete the client request data from the request column.

8. The network of claim 2, further comprising a database array, comprising:

a red data database for storing red RGB formatted client inputs and red RGB formatted provider inputs;

a green data database for storing green RGB formatted client inputs and green RGB formatted provider inputs; and a blue data database for storing blue RGB formatted client inputs and blue RGB formatted provider inputs.

9. The network of claim 8, further comprising a network processor configured to execute a spectrum shift across the database array, the spectrum shift comprising adjusting the RGB formatted client inputs by a client spectrum offset and adjusting the RGB formatted provider inputs by an opposite provider spectrum offset.

10. The network of claim 8, wherein the database array is configured to bidirectionally communicate with the client device via the network, and wherein the client device communicates RGB formatted client inputs:

to the red data database at a first network spectrum;

to the green data database at a second network spectrum; and to the blue data database at a third network spectrum, wherein the first network spectrum differs from the second network spectrum and from the third network spectrum, and wherein the second network spectrum differs from the third network spectrum.

11. A network, comprising:

a client device configured to:

bidirectionally communicate with the network; and receive, store, and process client inputs in a client computing device comprising at least a client processor and a client memory device, wherein the client inputs comprise at least client request data, client access data, and client scheduling data that are digitally processed within the client computing device, and wherein the client device processes the client inputs in the processor with a stored client algorithm from the stored memory device, the stored client algorithm configured to convert the client inputs into rows of client data columns in a synthesizing database stored in the memory device, the client data rows comprising transcoded RGB formatting of the client inputs, wherein the client algorithm is further configured to transcode the client request data to RGB formatting by mapping the client request data to a request pixel spectrum and assigning a request pixel value from the request pixel spectrum, and wherein receiving the client request data comprises at least collecting frequency data and category data as coordinates of the mapping.

12. The network of claim 11, wherein the client algorithm is further configured to shift the request pixel spectrum equivalent to a wavelength value across its coordinates according to a shift timing.

13. A network, comprising:

a client device configured to:

bidirectionally communicate with the network; and receive, store, and process client inputs in a client computing device comprising at least a client processor and a client memory device, wherein the client inputs comprise at least client request data, client access data, and client scheduling data that are digitally processed within the client computing device, wherein the client device processes the client inputs in the processor with a stored client algorithm from the stored memory device, the stored client algorithm configured to convert the client inputs into rows of client data columns in a synthesizing database stored in the memory device, the client data rows comprising transcoded RGB formatting of the client inputs, wherein the client algorithm is further configured to transcode the client access data to RGB formatting by mapping the client access data to an access pixel spectrum and assigning an access pixel value from the access pixel spectrum, and wherein receiving the client access data comprises at least collecting location data and correlating the location data to latitude data and longitude data as coordinates of the mapping.

14. A network, comprising:

a client device configured to:
  bidirectionally communicate with the network; and
  receive, store, and process client inputs in a client computing device comprising at least a client processor and a client memory device, wherein the client inputs comprise at least client request data, client access data, and client scheduling data that are digitally processed within the client computing device, wherein the client device processes the client inputs in the processor with a stored client algorithm from the stored memory device, the stored client algorithm configured to convert the client inputs into rows of client data columns in a synthesizing database stored in the memory device, the client data rows comprising transcoded RGB formatting of the client inputs, wherein the client algorithm is further configured to transcode the client scheduling data to RGB formatting by mapping the client scheduling data to a scheduling pixel spectrum and assigning a scheduling pixel value from the scheduling pixel spectrum, and wherein receiving the client scheduling data comprising collecting at least one of a start time, a stop time, and a duration as a coordinate of the mapping.

15. The network of claim 1, comprising:

a provider device configured to:
  bidirectionally communicate with the network; and
  digitally receive, store, and process provider inputs in a provider computing device comprising at least a provider processor and a provider memory device, wherein the provider inputs comprise at least provider request data, provider access data, and provider scheduling data; and a database array, wherein the provider device processes the provider inputs in the provider processor with a stored provider algorithm stored in the provider memory device, the provider algorithm configured to transcode the digital provider inputs into provider RGB formatted data such that:
  the provider request data comprises a red provider request data pixel, a green provider request data pixel, and a blue provider request data pixel;
  the provider access data comprises a red provider access data pixel, a green provider access data pixel, and a blue provider access data pixel; and
  the provider scheduling data comprises a red provider scheduling data pixel, a green provider scheduling data pixel, and a blue provider scheduling data pixel, and wherein the database array is configured to compare the client inputs to the provider inputs to search the database array for complementary pixel values that sum to white pixel values.

16. The network of claim 15, further comprising a database array, wherein the provider device is configured to communicate with the database array via the network, and wherein the provider device is configured to communicate:
  the red provider request data pixel, the red provider access data pixel, and the red provider scheduling data pixel to a red data database of the database array at a first network spectrum;
  the green provider request data pixel, the green provider access data pixel, and the green provider scheduling data pixel to a green data database of the database array at a second network spectrum; and
  the blue provider request data pixel, the blue provider access data pixel, and the blue provider scheduling data pixel to a blue data database of the database array at a third network spectrum,
  wherein the first network spectrum differs from the second network spectrum and from the third network spectrum, and
  wherein the second network spectrum differs from the third network spectrum.

17. The network of claim 16, wherein the database array is further configured to bidirectionally communicate with a client device via the network, and wherein the client device is configured to communicate client inputs comprising at least:
  client request data RGB formatted to comprise a red client request data pixel, a green client request data pixel, and a blue client request data pixel;
  client access data RGB formatted to comprise a red client access data pixel, a green client request data pixel, and a blue client request data pixel; and
  client scheduling data RGB formatted to comprise red client scheduling data pixel, a green client scheduling data pixel, and a blue client scheduling data pixel; and wherein the database array is configured to compare the client inputs to the provider inputs to search the database array for complementary pixel values that sum to white pixel values.

18. The network of claim 17, wherein the database array is further configured to communicate the provider inputs to the client device when:
  the provider request data is a complementary RGB format to the client request data;
  the provider access data is a complementary RGB format to the client access data; and
  the provider scheduling data is a complementary RGB format to the client scheduling data.

19. The network of claim 18, wherein, when the client device receives acceptance data indicating client acceptance of the complementary provider request data, provider access data, and provider scheduling data, the client acceptance data is forwarded to the provider device and the provider request data, the provider access data, and the provider scheduling data are deleted from the database array.

* * * * *